(12) United States Patent
Yoon

(10) Patent No.: US 10,556,516 B2
(45) Date of Patent: Feb. 11, 2020

(54) BATTERY CHARGING SYSTEM AND METHOD OF CONTROLLING THE SAME

(71) Applicants: Hyundai Motor Company, Seoul (KR); Kia Motors Corporation, Seoul (KR)

(72) Inventor: Jong Seo Yoon, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 85 days.

(21) Appl. No.: 16/004,650

(22) Filed: Jun. 11, 2018

(65) Prior Publication Data

US 2019/0168618 A1   Jun. 6, 2019

(30) Foreign Application Priority Data

Dec. 6, 2017   (KR) .................. 10-2017-0166343

(51) Int. Cl.
| | |
|---|---|
| *H02J 7/00* | (2006.01) |
| *B60L 53/60* | (2019.01) |
| *H01M 10/46* | (2006.01) |
| *H02J 7/04* | (2006.01) |
| *B60L 58/12* | (2019.01) |
| *B60L 53/22* | (2019.01) |
| *B60L 3/00* | (2019.01) |
| *B60L 53/14* | (2019.01) |

(Continued)

(52) U.S. Cl.
CPC ............ *B60L 53/60* (2019.02); *B60L 3/0023* (2013.01); *B60L 3/0069* (2013.01); *B60L 3/12* (2013.01); *B60L 53/14* (2019.02); *B60L 53/22* (2019.02); *B60L 58/10* (2019.02); *B60L 58/12* (2019.02); *H01M 10/46* (2013.01); *H02J 7/0006* (2013.01); *H02J 7/045* (2013.01); *B60L 2230/16* (2013.01); *B60L 2240/547* (2013.01); *B60L 2250/10* (2013.01)

(58) Field of Classification Search
None
See application file for complete search history.

(56) References Cited

U.S. PATENT DOCUMENTS

| | | | |
|---|---|---|---|
| 2009/0033294 A1* | 2/2009 | Odajima ............... | H02J 7/0029 320/166 |
| 2012/0056600 A1* | 3/2012 | Nevin ..................... | B60L 53/52 320/167 |
| 2016/0001766 A1* | 1/2016 | Mori ..................... | H01M 10/44 701/22 |

FOREIGN PATENT DOCUMENTS

KR      20130045708 A      5/2013

* cited by examiner

*Primary Examiner* — Samuel Berhanu
(74) *Attorney, Agent, or Firm* — Mintz Levin Cohn Ferris Glovsky and Popeo, P.C.; Peter F. Corless

(57) ABSTRACT

A battery charging system includes a battery, a charging equipment that charges the battery, a charge switch unit that determines an electrical connection between the battery and the charging equipment, a capacitor electrically connected in parallel between the battery and the charge switch unit, and a controller that determines whether an ignition of a vehicle is turned off or charging of the battery is completed, to determine whether the charge switch unit is fused by comparing a discharge rate of the capacitor and a preset first reference value after the charge switch unit is turned on/off when the ignition is turned off, and to determine whether a high voltage remains at an output terminal of the charging equipment by comparing a voltage of the capacitor and a preset second reference value after the charge switch unit is turned off when the charging is completed.

14 Claims, 3 Drawing Sheets

(51) Int. Cl.
*B60L 58/10* (2019.01)
*B60L 3/12* (2006.01)

BATTERY CHARGING SYSTEM AND METHOD OF CONTROLLING THE SAME

CROSS REFERENCE TO RELATED APPLICATION

The present application claims under 35 U.S.C. § 119(a) the benefit of Korean Patent Application No. 10-2017-0166343 filed on Dec. 6, 2017, the entire contents of which are incorporated by reference herein.

BACKGROUND

(a) Technical Field

The present disclosure relates to a battery charging system and a method of controlling the same, more particularly, to a battery charging system and method that are capable of controlling whether a rapid charge relay is individually fused, a high-voltage cable release determination, and a forced discharge, regardless of a failure of a communication control module of charging equipment.

(b) Description of the Related Art

An eco-friendly vehicle such as an electric vehicle (EV) or a plug-in hybrid electric vehicle (PHEV) is rapidly charged by charging equipment (for example, electric vehicle supply equipment (EVSE)) through cooperative control between a communication control module (CCM) and a battery management system (BMS).

After charging, the BMS checks the fusion state of rapid charge relays and the high-voltage level state of the charging equipment cables through the CCM and then releases the cables. However, if the CCM fails or control error occurs, it is impossible to determine a high-voltage level value. Hence, there is a problem in that the BMS may erroneously determine the fusion of the rapid charge relays and the release of the high-voltage charging cables.

Accordingly, there is a need for the solution capable of determining whether the rapid charge relays are individually fused and the high-voltage cables are released, regardless of the failure of the CCM.

The foregoing is intended merely to aid in the understanding of the background of the present disclosure, and is not intended to mean that the present disclosure falls within the purview of the related art that is already known to those skilled in the art.

SUMMARY

Accordingly, the present disclosure relates to a battery charging system and a method of controlling the same, which is capable of reducing customer dissatisfaction due to poor maintenance, driver's exposure to high voltage, and time delay for charging cable release by cooperatively controlling whether a rapid charge relay is individually fused, a high-voltage cable release determination, and a forced discharge, regardless of a failure of a communication control module of a charging equipment(for example, electric vehicle supply equipment (EVSE)).

In accordance with one aspect of the present disclosure, a battery charging system includes a battery configured to store electric energy therein, a charging equipment configured to provide charging power to the battery, a charge switch unit configured to determine an electrical connection between the battery and the charging equipment according to ON/OFF operation thereof, a capacitor electrically connected in parallel between the battery and the charge switch unit to form an electric potential during charging, and a controller configured to determine whether an ignition of a vehicle is turned off or charging of the battery is completed, to determine whether the charge switch unit is fused based on a result of comparison between a discharge rate of the capacitor and a preset first reference value after the charge switch unit is turned on/off when the ignition is turned off, and to determine whether a high voltage remains at an output terminal of the charging equipment based on a result of comparison between a voltage of the capacitor and a preset second reference value after the charge switch unit is turned off when the charging is completed.

The charge switch unit may include a first switch connected to a positive terminal of the charging equipment and a second switch connected to a negative terminal thereof, and the controller may turn on the first and second switches when the ignition is turned off, and then turn off the first switch.

The controller may determine that the first switch is fused when the discharge rate of the capacitor is greater than the preset first reference value, turn off the second switch, and then determine that the second switch is fused when the discharge rate of the capacitor is greater than a preset third reference value by comparing them.

When it is determined that the charge switch unit is fused, the controller may output a warning message.

When the voltage of the capacitor is greater than the preset second reference value when the charging is completed, the controller may determine that the high voltage remains at the output terminal of the charging equipment.

The battery charging system may further include a forced discharge unit including a relay and a resistor, the forced discharge unit being electrically connected in parallel between the capacitor and the charge switch unit to discharge the voltage of the capacitor when the relay is turned on, and when it is determined that the high voltage remains at the output terminal of the charging equipment, the controller may cause the high voltage to be discharged by the forced discharge unit.

The battery charging system may further include a fusion determination unit electrically connected in parallel between the charge switch unit and the charging equipment to discharge the voltage of the capacitor when the charge switch unit is turned on.

In accordance with another aspect of the present disclosure, a battery charging system includes a battery for storing electric energy therein, a main switch unit connected, at one terminal thereof, to an output terminal of the battery, and turned on when the battery is charged, a charge switch unit connected to the other terminal of the main switch unit, and turned on when the battery is charged, a charging equipment connected to the other terminal of the charge switch unit, for charging the battery, a capacitor connected in parallel between the other terminal of the main switch unit and one terminal of the charge switch unit to form an electric potential during charging, a forced discharge unit connected in parallel between the other terminal of the main switch unit and the one terminal of the charge switch unit to discharge a voltage of the capacitor when a relay is turned on, a fusion determination unit connected in parallel between the other terminal of the charge switch unit and an output terminal of the charging equipment, and a controller configured to determine whether ignition of a vehicle is turned off or charging of the battery is completed, to determine whether the charge switch unit is fused based on a result of comparison between a discharge rate of the capacitor and a preset first reference value after the charge switch unit is turned on/off when the ignition is turned off, and to determine whether a high voltage remains at the output terminal of the charging equipment based on a result of comparison between the voltage of the capacitor and a preset second reference value after the charge switch unit is turned off when the charging is completed.

In accordance with a further aspect of the present disclosure, a method of controlling a battery charging system incorporates the battery charging system as described above, and includes determining whether the ignition of the vehicle is turned off or the charging of the battery is completed, determining whether the charge switch unit is fused based on the result of comparison between the discharge rate of the capacitor and the preset first reference value after the charge switch unit is turned on/off when the ignition is turned off, and determining whether the high voltage remains at the output terminal of the charging equipment based on the result of comparison between the voltage of the capacitor and the preset second reference value after the charge switch unit is turned off when the charging is completed.

The charge switch unit of the battery charging system may include a first switch connected to a positive terminal of the charging equipment and a second switch connected to a negative terminal thereof, and in the determining whether the charge switch unit is fused, the first and second switches may be turned on when the ignition is turned off, and then the first switch may be turned off.

Determining whether the charge switch unit is fused may include determining that the first switch is fused when the discharge rate of the capacitor is greater than the preset first reference value, and turning off the second switch, and then determining that the second switch is fused when the discharge rate of the capacitor is greater than a preset third reference value by comparing them.

In determining whether the charge switch unit is fused, when it is determined that the charge switch unit is fused, a warning message may be output.

Determining whether the high voltage remains at the output terminal of the charging equipment may include comparing the voltage of the capacitor with the preset second reference value, and determining that the high voltage remains when the voltage of the capacitor is greater than the preset second reference value as a result of the comparison.

In determining whether the high voltage remains at the output terminal of the charging equipment, when it is determined that the high voltage remains, the high voltage may be discharged by the forced discharge unit.

As apparent from the above description, in accordance with the battery charging system and the method of controlling the same of the present disclosure, it is possible to reduce customer dissatisfaction due to poor maintenance, the driver's exposure to high voltage, and the time delay for charging cable release by cooperatively controlling whether the rapid charge relay is individually fused, the high-voltage cable release determination, and the forced discharge, regardless of the failure of the CCM of the charging equipment.

In addition, the existing technology may not detect the individual fusion of the rapid charge relay, but the present disclosure can detect the individual fusion of the rapid charge relay in all electric vehicles (EVs).

In addition, the charging cable can be quickly released by forcibly discharging the high voltage remaining in the capacitor after the completion of charging.

In addition, it is possible to forcibly discharge the high voltage remaining in the capacitor through cooperative control with the MCU in the vehicle even though the charging equipment or the CCM fails.

Further, whether the rapid charge relay is fused is able to be determined during charging in the related art, but the present disclosure is advantageous in that it can be determined even after traveling.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A battery charging system and a method of controlling the same according to the preferred embodiments of the present disclosure will be described below with reference to the accompanying drawings.

Figure 1:
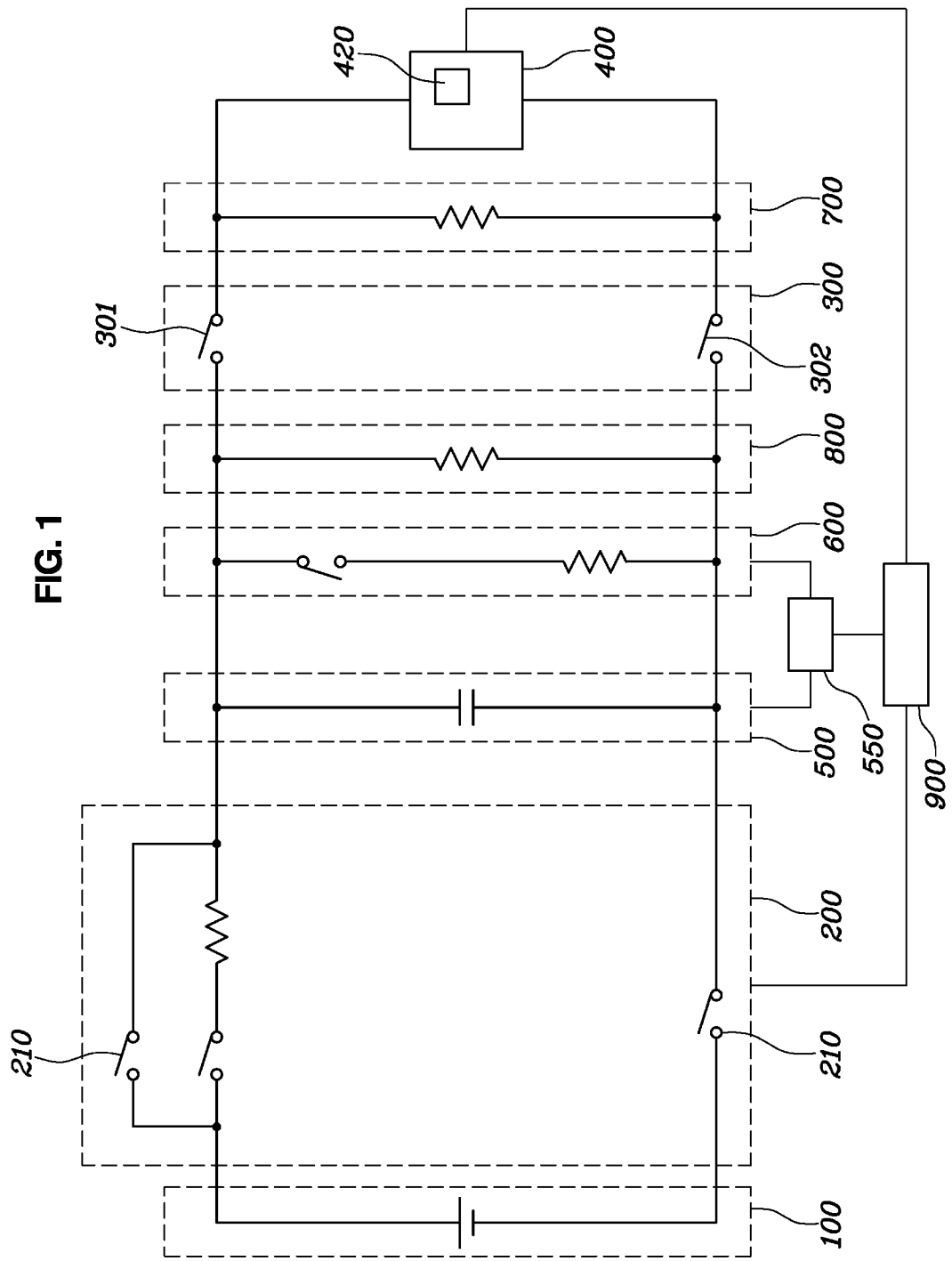
FIG. 1 is a schematic diagram illustrating a battery charging system according to an embodiment of the present disclosure.
Figure 2:
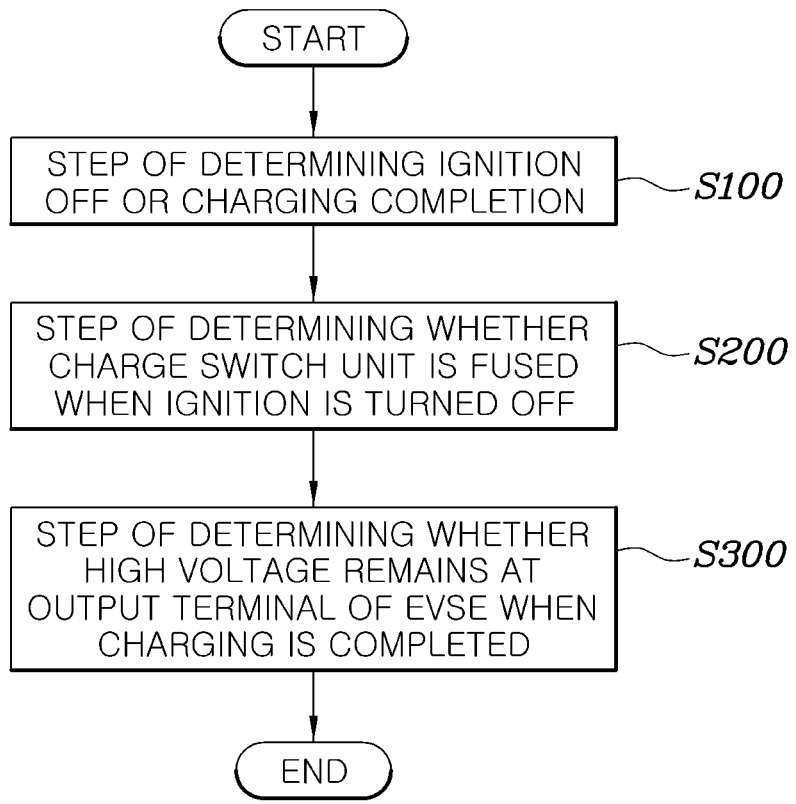
FIG. 2 is a first flowchart illustrating a method of controlling a battery charging system according to an embodiment of the present disclosure.
Figure 3:
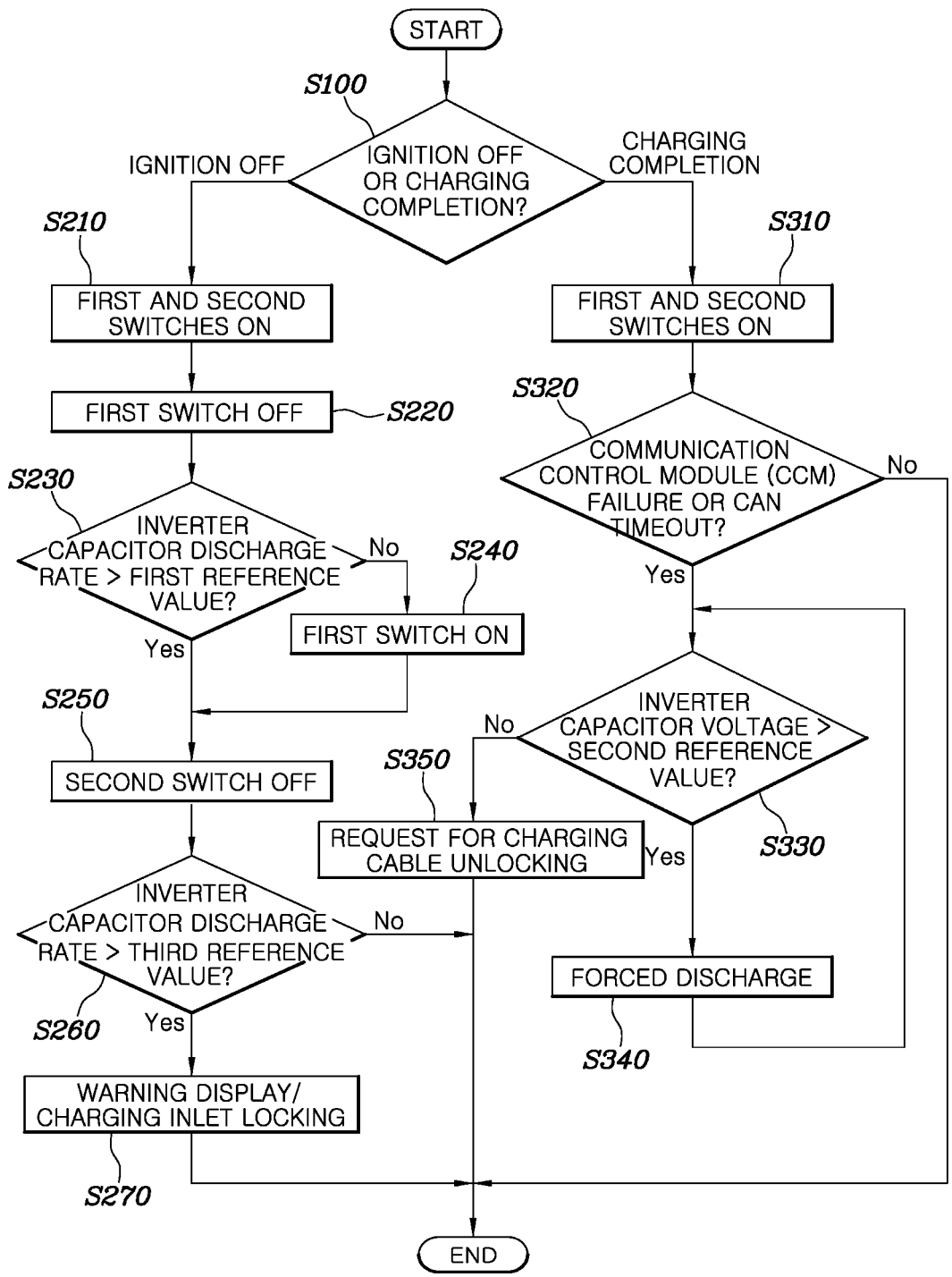
FIG. 3 is a second flowchart illustrating the method of controlling the battery charging system according to the embodiment of the present disclosure.

FIG. 1 is a schematic diagram illustrating a battery charging system according to an embodiment of the present disclosure. FIG. 2 is a first flowchart illustrating a method of controlling a battery charging system according to an embodiment of the present disclosure. FIG. 3 is a second flowchart illustrating the method of controlling the battery charging system according to the embodiment of the present disclosure.

Referring to FIG. 1, the battery charging system according to the embodiment of the present disclosure includes a battery 100 for storing electric energy therein, a charging equipment (for example, electric vehicle supply equipment (EVSE)) 400 that charges the battery 100, a charge switch unit 300 that determines an electrical connection between the battery 100 and the charging equipment 400 according to an ON/OFF operation thereof, a capacitor 500 that is electrically connected in parallel between the battery 100 and the charge switch unit 300 to form an electric potential during charging, and a controller 900 that determines whether the ignition of a vehicle is turned off or the charging of the battery 100 is completed, determines whether the charge switch unit 300 is fused based on the result of comparison between the discharge rate of the capacitor 500 and a preset first reference value after the charge switch unit 300 is turned on/off when the ignition is turned off, and determines whether a high voltage remains at the output terminal of the charging equipment 400 based on the result of comparison between the voltage of the capacitor 500 and a preset second reference value after the charge switch unit 300 is turned off when the charging is completed.

In an embodiment of the present disclosure, the battery 100 may be a high-voltage battery. The battery 100 stores electric energy from the charging equipment.

The charging equipment 400 includes a communication control module (CCM) 420, and charges the battery 100 in response to the command of the controller 900.

In an embodiment of the present disclosure, the charge switch unit 300 may be a rapid charge relay. The charge switch unit 300 includes a first switch 301 connected to a positive terminal as the output terminal of the charging equipment 400 and a second switch 302 connected to a negative terminal, and determines the electrical connection between the battery 100 and the charging equipment 400 according to the ON/OFF operation of the first and second switches 301 and 302.

A main switch unit 200 is connected, at one terminal thereof, to the output terminal of the battery 100, includes a relay 210, and the relay 210 is turn on when the battery is charged.

The capacitor 500 is connected in parallel between the other terminal of the main switch unit 200 and one terminal of the charge switch unit 300 to form an electric potential during charging.

A forced discharge unit 600 includes a relay and a resistor, and is connected in parallel between the other terminal of the main switch unit 200 and the one terminal of the charge switch unit 300 to discharge the voltage of the capacitor 500 when the relay is turned on.

In an embodiment of the present disclosure, a natural discharge unit 800 may include a resistor. The natural discharge unit 800 is connected in parallel between the other terminal of the main switch unit 200 and one terminal of the charge switch unit 300 to discharge the voltage of the capacitor 500 when the charge switch unit 300 is turned on.

A fusion determination unit 700 is connected in parallel between the other terminal of the charge switch unit 300 and the output terminal of the charging equipment 400 to discharge the voltage of the capacitor 500 when the charge switch unit 300 is turned on. In an embodiment of the present disclosure, the fusion determination unit 700 may be a resistor for determining whether the charge switch unit 300 is individually fused which will be described later. The resistor of the fusion determination unit 700 may be a variable resistor.

The controller 900 determines whether the charge switch unit 300 is fused and whether a high voltage remains at the output terminal of the charging equipment 400, through cooperative control with the CCM included in the charging equipment 400 and a motor control unit (MCU) 550 provided in the vehicle. In detail, the controller 900 determines whether the ignition of the vehicle is turned off or the charging of the battery 100 is completed, determines whether the charge switch unit 300 is fused based on the result of comparison between the discharge rate of the capacitor 500 and the preset first reference value after the charge switch unit 300 is turned on/off when the ignition is turned off, and determines whether a high voltage remains at the output terminal of the charging equipment 400 based on the result of comparison between the voltage of the capacitor 500 and the preset second reference value after the charge switch unit 300 is turned off when the charging is completed.

A detailed control process of the controller 900 will be described with reference to the following method of controlling a battery charging system.

Referring to FIGS. 2 and 3, the method of controlling a battery charging system according to the embodiment of the present disclosure includes a step S100 of determining whether the ignition of a vehicle is turned off or the charging of a battery is completed, a step S200 of determining whether a charge switch unit is fused based on the result of comparison between the voltage discharge rate of a capacitor and a preset first reference value after the charge switch unit is turned on/off when the ignition is turned off, and a step S300 of determining whether a high voltage remains at the output terminal of the charging equipment based on the result of comparison between the voltage of the capacitor and a preset second reference value after the charge switch unit is turned off when the charging is completed.

In the step of determining whether the ignition of a vehicle is turned off or the charging of a battery is completed (S100), whether the ignition of the vehicle is turned off may be determined based on the state of an IG, and whether the charging of the battery is completed may be determined by measuring a state of charge (SOC) of the battery.

In the step of determining whether a charge switch unit is fused (S200), first, when it is determined that the ignition is turned off, first and second switches are turned on, and then the first switch is turned off (S210 and S220). Next, the discharge rate of the capacitor is compared with the preset first reference value (S230), in which case when the discharge rate of the capacitor is greater than the preset first reference value as a result of the comparison, it is determined that the first switch is fused. If the discharge rate of the capacitor is less than the preset first reference value as a result of the comparison, it is determined that the first switch is not fused and so the first switch is turned on again for determination of whether the second switch is fused (S240).

The first reference value is a value which may vary depending on the setting, and may be twice the natural discharge rate of the capacitor in an embodiment of the present disclosure. When the charge switch unit is fused, the discharge rate of the capacitor is increased due to an increase in natural voltage discharge resistance thereof. When the resistance value of the fusion determination unit is set as a value similar to the resistance value of a natural discharge unit, the discharge rate of the capacitor may be twice the discharge rate of the capacitor. The discharge rate is also variable by varying the resistance value of the fusion determination unit.

Meanwhile, when it is determined that the first switch is fused, the second switch is turned off (S250) and then the discharge rate of the capacitor is compared with a preset third reference value (S260), for determination of whether the second switch is fused. When the discharge rate of the capacitor is greater than the preset third reference value as a result of the comparison, it is determined that the second switch is fused.

The third reference value is a value which may vary depending on the setting, and may be equal to the first reference value in an embodiment of the present disclosure.

Although not illustrated in the drawings, a warning message may be output onto the head unit of the vehicle when it is determined that the charge switch unit is fused in an embodiment of the present disclosure. In addition, in an embodiment of the present disclosure, when it is determined that the charge switch unit is fused after the charging is completed, a charging inlet lid may be locked to prevent exposure to high voltage, and the charging inlet lid may be unlocked only when the charge switch unit is not fused after replacement thereof.

As described above, the process proceeds to the step of determining whether a charge switch unit is fused (S200) to determine whether the charge switch unit is fused. Thus, it is advantageous to determine whether the charge switch unit is fused even during the completion of normal traveling as well as charging.

In the step of determining whether a high voltage remains at the output terminal of a charging equipment (S300), first, when it is determined that the charging is completed, the first and second switches are turned off (S310) and then it is determined whether the CCM fails or CAN timeout occurs (S320). When it is determined that the CCM does not fail or the CAN timeout does not occur, the controller compares the output voltage of the charging equipment received from the CCM 420 or the voltage of the capacitor received from the MCU 550 with the preset second reference value.

When it is determined that the CCM fails or the CAN timeout occurs, the controller compares the voltage of the capacitor received from the MCU 550 with the preset second reference value (S330). Here, the second reference value is a value which may vary depending on the setting, and may be 60 V in an embodiment of the present disclosure.

When the voltage of the capacitor is greater than the preset second reference value as a result of the comparison, it is determined that a high voltage remains. Thus, the controller makes a request for forced discharge to the MCU 550 so that the forced discharge is performed when the relay of the forced discharge unit is turned on (S340). To discharge the high voltage remaining at the output terminal of the charging equipment when the charging is completed, the forced discharge is performed through cooperative control with the MCU 550, thereby dropping the high voltage to less than the reference voltage (second reference value) in several hundred ms to rapidly release the charging cable. In addition, it is possible to reinforce the release logic of the charging cable, based on the voltage of the capacitor received from the MCU 550 even though the output voltage of the charging equipment may not be reliable due to the abnormality of the CCM 420 or the charging equipment.

When the voltage of the capacitor is less than the preset second reference value as a result of the comparison, the controller makes a request for charging cable unlocking to the CCM 420.

In accordance with the embodiments of the present disclosure, it is possible to reduce customer dissatisfaction due to poor maintenance, the drivers exposure to high voltage, and the time delay for charging cable release by cooperatively controlling whether the rapid charge relay is individually fused, the high-voltage cable release determination, and the forced discharge, regardless of the failure of the CCM of the charging equipment.

In addition, the existing technology may not detect the individual fusion of the rapid charge relay, but the present disclosure can detect the individual fusion of the rapid charge relay in all electric vehicles (EVs).

In addition, the charging cable can be quickly released by forcibly discharging the high voltage remaining in the capacitor after the completion of charging.

In addition, it is possible to forcibly discharge the high voltage remaining in the capacitor through cooperative control with the MCU in the vehicle even though the charging equipment or the CCM fails.

In addition, whether the rapid charge relay is fused is able to be determined during charging in the related art, but the present disclosure is advantageous in that it can be determined even after traveling.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A battery charging system, comprising:
 a battery configured to store electric energy therein;
 a charging equipment configured to provide electric power to the battery;
 a charge switch unit configured to determine an electrical connection between the battery and the charging equipment according to an ON/OFF operation thereof;
 a capacitor electrically connected in parallel between the battery and the charge switch unit to form an electric potential during charging; and
 a controller configured to determine whether an ignition of a vehicle is turned off or charging of the battery is completed, to determine whether the charge switch unit is fused based on a result of comparison between a discharge rate of the capacitor and a preset first reference value after the charge switch unit is turned on/off when the ignition is turned off, and to determine whether a high voltage remains at an output terminal of the charging equipment based on a result of comparison between a voltage of the capacitor and a preset second reference value after the charge switch unit is turned off when the charging is completed.

2. The battery charging system according to claim 1, wherein:
the charge switch unit comprises a first switch connected to a positive terminal of the charging equipment and a second switch connected to a negative terminal thereof; and
the controller turns on the first and second switches when the ignition is turned off, and then turns off the first switch.

3. The battery charging system according to claim 2, wherein the controller determines that the first switch is fused when the discharge rate of the capacitor is greater than the preset first reference value, turns off the second switch, and then determines that the second switch is fused when the discharge rate of the capacitor is greater than a preset third reference value by comparing them.

4. The battery charging system according to claim 1, wherein when it is determined that the charge switch unit is fused, the controller outputs a warning message.

5. The battery charging system according to claim 1, wherein when the voltage of the capacitor is greater than the preset second reference value when the charging is completed, the controller determines that the high voltage remains at the output terminal of the charging equipment.

6. The battery charging system according to claim 1, further comprising a forced discharge unit comprising a relay and a resistor, the forced discharge unit being electrically connected in parallel between the capacitor and the charge switch unit to discharge the voltage of the capacitor when the relay is turned on,
wherein when it is determined that the high voltage remains at the output terminal of the charging equipment, the controller causes the high voltage to be discharged by the forced discharge unit.

7. The battery charging system according to claim 1, further comprising a fusion determination unit electrically connected in parallel between the charge switch unit and the charging equipment to discharge the voltage of the capacitor when the charge switch unit is turned on.

8. A battery charging system, comprising:
a battery for storing electric energy therein;
a main switch unit connected, at one terminal thereof, to an output terminal of the battery, and turned on when the battery is charged;
a charge switch unit connected to the other terminal of the main switch unit, and turned on when the battery is charged;
a charging equipment connected to the other terminal of the charge switch unit, for charging the battery;
a capacitor connected in parallel between the other terminal of the main switch unit and one terminal of the charge switch unit to form an electric potential during charging;
a forced discharge unit connected in parallel between the other terminal of the main switch unit and the one terminal of the charge switch unit to discharge a voltage of the capacitor when a relay is turned on;
a fusion determination unit connected in parallel between the other terminal of the charge switch unit and an output terminal of the charging equipment; and
a controller configured to determine whether ignition of a vehicle is turned off or charging of the battery is completed, to determine whether the charge switch unit is fused based on a result of comparison between a discharge rate of the capacitor and a preset first reference value after the charge switch unit is turned on/off when the ignition is turned off, and to determine whether a high voltage remains at the output terminal of the charging equipment based on a result of comparison between the voltage of the capacitor and a preset second reference value after the charge switch unit is turned off when the charging is completed.

9. A method of controlling a battery charging system, comprising:
providing the battery charging system, including:
a battery configured to store electric energy therein;
a charging equipment configured to provide electric power to the battery;
a charge switch unit configured to determine an electrical connection between the battery and the charging equipment according to an ON/OFF operation thereof;
a capacitor electrically connected in parallel between the battery and the charge switch unit to form an electric potential during charging; and
a controller configured to determine whether an ignition of a vehicle is turned off or charging of the battery is completed, to determine whether the charge switch unit is fused based on a result of comparison between a discharge rate of the capacitor and a preset first reference value after the charge switch unit is turned on/off when the ignition is turned off, and to determine whether a high voltage remains at an output terminal of the charging equipment based on a result of comparison between a voltage of the capacitor and a preset second reference value after the charge switch unit is turned off when the charging is completed;
determining whether the ignition of the vehicle is turned off or the charging of the battery is completed;
determining whether the charge switch unit is fused based on the result of comparison between the discharge rate of the capacitor and the preset first reference value after the charge switch unit is turned on/off when the ignition is turned off; and
determining whether the high voltage remains at the output terminal of the charging equipment based on the result of comparison between the voltage of the capacitor and the preset second reference value after the charge switch unit is turned off when the charging is completed.

10. The method according to claim 9, wherein:
the charge switch unit of the battery charging system comprises a first switch connected to a positive terminal of the charging equipment and a second switch connected to a negative terminal thereof; and
in determining whether the charge switch unit is fused, the first and second switches are turned on when the ignition is turned off, and then the first switch is turned off.

11. The method according to claim 10, wherein determining whether the charge switch unit is fused comprises:
determining that the first switch is fused when the discharge rate of the capacitor is greater than the preset first reference value; and
turning off the second switch, and then determining that the second switch is fused when the discharge rate of the capacitor is greater than a preset third reference value by comparing them.

12. The method according to claim 9, wherein in determining whether the charge switch unit is fused, when it is determined that the charge switch unit is fused, a warning message is output.

13. The method according to claim 9, wherein determining whether the high voltage remains at the output terminal of the charging equipment comprises:
- comparing the voltage of the capacitor with the preset second reference value; and
- determining that the high voltage remains when the voltage of the capacitor is greater than the preset second reference value as a result of the comparison.

14. The method according to claim 9, wherein:
- the battery charging system further comprises a forced discharge unit comprising a relay and a resistor, the forced discharge unit being electrically connected in parallel between the capacitor and the charge switch unit to discharge the voltage of the capacitor when the relay is turned on; and
- in determining whether the high voltage remains at the output terminal of the charging equipment, when it is determined that the high voltage remains, the high voltage is discharged by the forced discharge unit.

* * * * *